US011190272B1

(12) United States Patent
Jiang

(10) Patent No.: US 11,190,272 B1
(45) Date of Patent: Nov. 30, 2021

(54) METHOD AND APPARATUS FOR EVALUATING NONLINEAR IMPAIRMENT OF AN OPTICAL FIBER LINK

(71) Applicant: HUAWEI TECHNOLOGIES CO., LTD., Shenzhen (CN)

(72) Inventor: Zhiping Jiang, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/127,305

(22) Filed: Dec. 18, 2020

(51) Int. Cl.
*H04B 10/079* (2013.01)
*H04B 10/2537* (2013.01)

(52) U.S. Cl.
CPC ............... *H04B 10/07953* (2013.01); *H04B 10/07955* (2013.01); *H04B 10/07957* (2013.01); *H04B 10/2537* (2013.01)

(58) Field of Classification Search
CPC .......... H04B 10/07953; H04B 10/2537; H04B 10/07957; H04B 10/07955; H04B 10/18; H04B 10/27; H01S 3/067; G02B 6/00; H04J 14/02
USPC .......................................................... 398/26
See application file for complete search history.

(56) References Cited

U.S. PATENT DOCUMENTS

| 6,011,892 A * | 1/2000 | Chraplyvy | H04B 10/255 |
| | | | 385/123 |
| 7,310,318 B1 * | 12/2007 | Frankel | H04B 10/25137 |
| | | | 370/252 |
| 10,122,443 B2 * | 11/2018 | Seve | H04B 10/07953 |
| 2005/0169637 A1 * | 8/2005 | Alberti | H04B 10/2531 |
| | | | 398/150 |
| 2007/0031155 A1 * | 2/2007 | Minzioni | H04B 10/25253 |
| | | | 398/147 |
| 2008/0068236 A1 * | 3/2008 | Sheba | G04F 10/005 |
| | | | 341/118 |

(Continued)

FOREIGN PATENT DOCUMENTS

| CN | 104253650 A | 12/2014 |
| CN | 104980379 A | 10/2015 |
| WO | 2015155520 A1 | 10/2015 |

OTHER PUBLICATIONS

Seve E. et al., "Semi-analytical model for the performance estimation of 100 Gb/S PDM-QPSK optical transmission systems without inline dispersion compensation and mixed fiber types," in Proc. 39th ECOC, Sep. 2013, paper Th.1. D.2.

Zhiping Jiang et al, Direc Nonlinear Noise Monitoring for In-Service Signals in Coherent Systems, 2020 European Conference on Optical Communications (ECOC), date of Conference: Dec. 6-10, 2020, Date Added to IEEE Xplore: Feb. 4, 2021, total 4 pages.

(Continued)

*Primary Examiner* — Abbas H Alagheband

(57) ABSTRACT

There is provided a method and apparatus for evaluating nonlinear impairment of an optical fiber link. The method includes partitioning a natural span of the optical fiber link into multiple sub-spans, each of the multiple sub-spans determined based on chromatic dispersion (CD) equivalence; The method further includes for each of the multiple sub-spans, acquiring sub-span function parameters and a sub-span input power indicative of input power at a particular sub-span, the sub-span function parameters including noise variance and correlations between the particular sub-span and others of the multiple sub-spans. The method additionally includes determining the nonlinear impairment of the optical fiber link based on the sub-span input power and the sub-span function parameters acquired for each of the multiple sub-spans.

20 Claims, 10 Drawing Sheets

(56) References Cited

U.S. PATENT DOCUMENTS

| | | | | |
|---|---|---|---|---|
| 2009/0324224 | A1* | 12/2009 | Xie | H04B 10/60 398/65 |
| 2010/0329686 | A1* | 12/2010 | Frankel | H04B 10/25253 398/83 |
| 2012/0219303 | A1* | 8/2012 | Li | H04B 10/2543 398/208 |
| 2014/0199076 | A1* | 7/2014 | Yu | H04B 10/2543 398/81 |
| 2015/0010300 | A1* | 1/2015 | Fan | H04B 10/0731 398/29 |
| 2017/0019178 | A1* | 1/2017 | Alic | H04B 10/2543 |
| 2017/0041078 | A1* | 2/2017 | Le | H04B 10/2543 |
| 2017/0244480 | A1* | 8/2017 | Seve | H04B 10/07953 |
| 2017/0272163 | A1* | 9/2017 | Alic | H04J 14/02 |
| 2019/0107671 | A1* | 4/2019 | Yaman | G02B 6/02042 |

OTHER PUBLICATIONS

Keang-Po Ho et al, Electronic Compensation Technique to Mitigate Nonlinear Phase Noise, Journal of Lightwave Technology, vol. 22, No. 3, Mar. 2004, total 5 pages.

Fangyuan Zhang et al, Fast Analytical Evaluation of Fiber Nonlinear Noise Variance in Mesh Optical Networks, C88 J. OPT. Commun. NETW./vol. 9, No. 4/Apr. 2017, total 10 pages.

Ilavarasan Tamilarasan et al, Improved ber nonlinearity mitigation in dispersion managed optical OFDM links, Contents lists available at ScienceDirect, Optics Communicaations, Journal Homepage: www.elsevier.com/locate/optcom, vol. 385, Feb. 15, 2017, total 5 pages.

F. J. Vaquero Caballero et al, Machine Learning Based Linear and Nonlinear Noise Estimation, D42 J. OPT. Commun. NETW/vol. 10, Oct. 10, 2018, total 10 pages.

* cited by examiner

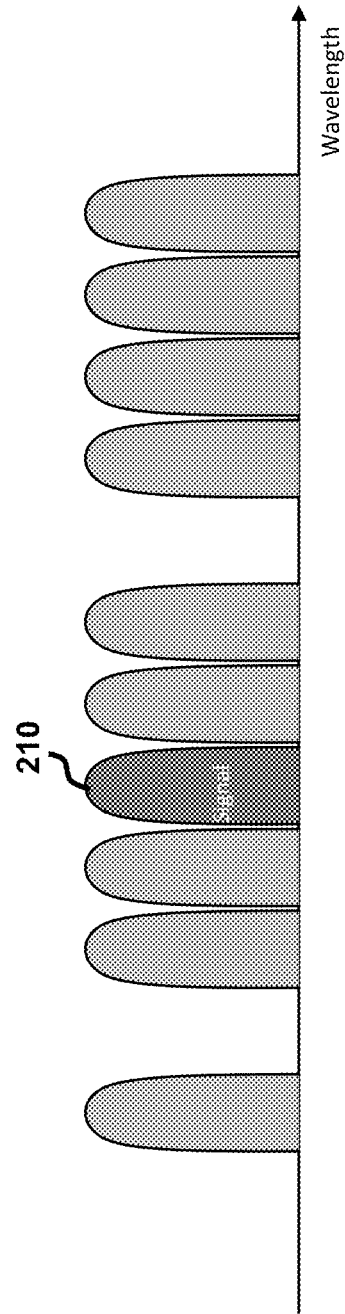
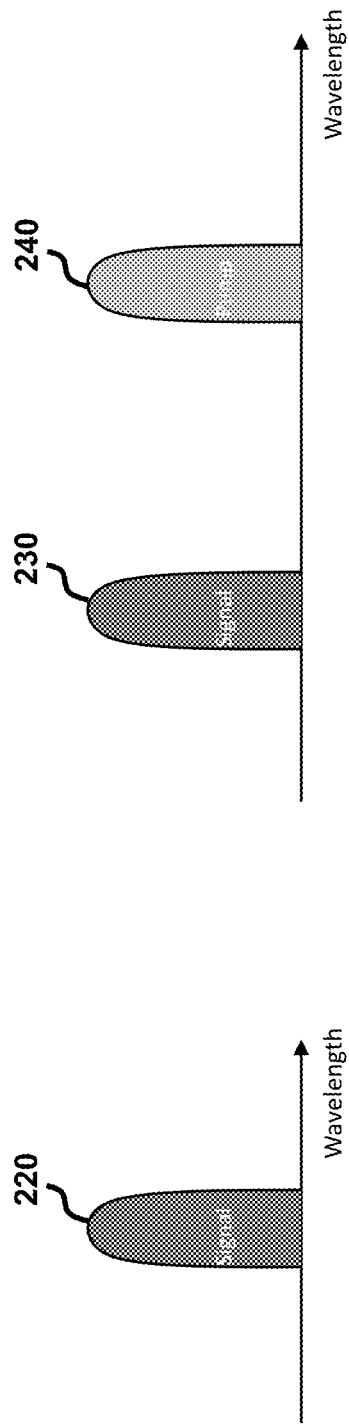
FIG. 2A
FIG. 2C
FIG. 2B

METHOD AND APPARATUS FOR EVALUATING NONLINEAR IMPAIRMENT OF AN OPTICAL FIBER LINK

FIELD OF THE INVENTION

The present invention pertains to the field of optical transport technology and in particular to a method and apparatus for evaluating nonlinear impairment of an optical fiber link.

BACKGROUND

In optical networks, one of critical concerns in relation to transmitting performance is nonlinear impairments on optical fibers, such as fiber nonlinear interference (NLI). In other words, fiber NLI or nonlinear noise is one of the most significant factors limiting performance in coherent optical communication systems. As modern coherent transceivers usually have a substantial capability to process digital signals, the linear impairments, such as chromatic dispersion, can be fully compensated for by the receiver (Rx) digital signal processor (DSP). As such, dispersion uncompensated links can be used for other advantages, such as cost savings (i.e. no dispersion compensation fiber/module is required), higher optical signal to noise ratio (OSNR) (i.e. no additional loss from the dispersion compensation fiber/module) and lower fiber nonlinearity (i.e. NLI generated in different link locations is less coherent when compared to NLI in a dispersion compensated link).

In a dispersion uncompensated link, despite the impairment in performance, NLI can be treated as an additive noise as it enables or makes the modeling easier (e.g. through the generation and inclusion of white noise). Thus, many attempts have been made to model NLI in both academia and industry.

One well-known example is so-called the Gaussian noise (GN) model, which assumes the channels are Gaussian (i.e. a channel's Gaussianity assumption) and therefore neglects the effect of the modulation format. While the GN model provides higher efficiency, it is less accurate (e.g. 5-15% reach loss). The GN model has been improved to an enhanced GN model (eGN). Unlike the GN model, the eGN model includes the impact of modulation format and can handle non-Gaussian channels. The eGN model provides higher accuracy than the GN model. The eGN model has been extensively investigated, verified by both simulation and experiment. However, the eGN model has drawbacks in that its calculation is intensive and therefore is very time consuming, as it involves multiple integrations (e.g. 3-fold integration) and massive computation. For example, for designing tools or dynamic routing algorithms, the calculation can be performed tens of thousand times. Thus, a faster model is highly desired (e.g. in the order of a millisecond or faster). An example of the eGN model is provided below:

$$G_{SCI}^{EGN}(f) = P_{SCI}^3[\kappa_1(f) + \Phi_a \kappa_2(f) + \Psi_a \kappa_3(f)] \quad (5)$$

$$\text{where:} \Phi_a = \frac{E\{|a|^4\}}{E^2\{|a|^2\}} - 2, \; \Psi_a = \frac{E\{|a|^6\}}{E^3\{|a|^2\}} - 9\frac{E\{|a|^4\}}{E^2\{|a|^2\}} + 12 \quad (6)$$

$$\kappa_1(f) = \frac{16}{27} R_s^3 \int_{-R_S/2}^{+R_S/2} df_1 \int_{-R_S/2}^{+R_S/2} df_2 |S_{CUT}(f_1)|^2 |S_{CUT}(f_2)|^2 |S_{CUT}(f_1+f_2-f)|^2 |\mu(f_1,f_2,f)|^2 \quad (7)$$

$$\kappa_2(f) = \quad (8)$$

$$\frac{80}{81} R_s^2 \int_{-R_S/2}^{+R_S/2} df_1 \int_{-R_S/2}^{+R_S/2} df_2 \int_{-R_S/2}^{+R_S/2} df'_2 |S_{CUT}(f_1)|^2 S_{CUT}(f_2) S_{CUT}^*(f'_2) S_{CUT}^*(f_1+f_2-f) S_{CUT}(f_1+f'_2-f)$$

$$\mu^*(f_1,f_2,f)\mu^*(f_1,f'_2,f) +$$

$$\frac{16}{81} R_s^2 \int_{-R_S/2}^{+R_S/2} df_1 \int_{-R_S/2}^{+R_S/2} df_2 \int_{-R_S/2}^{+R_S/2} df'_2 |S_{CUT}(f_1+f_2-f)|^2 S_{CUT}(f_1) S_{CUT}(f_2) S_{CUT}^*(f_1+f_2-f'_2) S_{CUT}^*(f'_2)\mu(f_1,f_{M2}f)\mu^*(f_1+f_2-f'_2,f'_2,f)$$

$$\kappa_3(f) = \quad (9)$$

$$\frac{16}{81} R_s \int_{-R_S/2}^{+R_S/2} df_1 \int_{-R_S/2}^{+R_S/2} df_2 \int_{-R_S/2}^{+R_S/2} df'_1 \int_{-R_S/2}^{+R_S/2} df'_2 S_{CUT}(f_1) S_{CUT}(f_2) S_{CUT}^*(f_1+f_2-f) S_{CUT}^*(f'_1) S_{CUT}^*(f'_2)$$

$$S_{CUT}(f'_1+f'_2-f)\mu(f_1,f_2,f)\mu^*(f'_1,f'_2,f)$$

Therefore, a method for modeling nonlinear impairment (e.g. NLI modeling method) that can be performed at a faster speed relative to current approaches is desired. As the evaluation and modelling of nonlinear impairment currently involves heavy computation, there is a need for a method and apparatus for evaluating nonlinear impairment of an optical fiber link, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for evaluating nonlinear impairment of an optical fiber link.

In accordance with embodiments of the present invention, there is provided method for evaluating or assessing nonlinear impairment of an optical fiber link. The method includes partitioning a natural span of the optical fiber link into multiple sub-spans, each of the multiple sub-spans determined based on chromatic dispersion (CD) equivalence. For each of the multiple sub-spans, the method further includes acquiring sub-span function parameters and a sub-span input power indicative of input power at a particular sub-span, the sub-span function parameters including noise variance and correlations between the particular sub-span and others of the multiple sub-spans. The method additionally includes determining the nonlinear impairment of the optical fiber link based on the sub-span input power and the sub-span function parameters acquired for each of the multiple sub-spans. A technical result of this embodiment may be that the NLI evaluation method can be used for arbitrary links with non-uniform fiber span length, mixed fiber types, arbitrary signal format, and can be performed at a faster speed relative to current approaches.

According to some embodiments, the step of determining the nonlinear impairment of the optical fiber link includes acquiring natural span function parameters based on the sub-span input power and the sub-span function parameters acquired for each of the multiple sub-spans and determining the nonlinear impairment of the optical fiber link based on the natural span input power and the natural span function parameters.

According to some embodiments, the nonlinear impairment of the optical fiber link is evaluated or assessed independently from fiber type, fiber length, fiber attenuation and stimulated Raman scattering (SRS) associated with the optical fiber link. According to some embodiments, the noise variance and correlations between the particular sub-span and others of the multiple sub-spans depends on CD and signal modulation format.

According to some embodiments, the sub-span function parameters acquired for each of the multiple sub-spans are saved in a database. According to some embodiments, the natural span function parameters are acquired based on link topology associated with the optical fiber link. According to some embodiments, the natural span function parameters are acquired based on a power ratio between the sub-span input power and a natural span input power indicative of input power of the natural span. According to some embodiments, the natural span function parameters are acquired without absolute values of the sub-span input power and the natural span input power.

According to some embodiments, at least some of the multiple sub-spans have different lengths. According to some embodiments, the input power of each of the multiple sub-spans is acquired using input power of the natural span and a fiber attenuation coefficient.

In accordance with embodiments of the present invention, there is provided an apparatus for evaluating or assessing nonlinear impairment of an optical fiber link. The apparatus includes a processor and a machine readable memory including machine readable instructions, the machine readable instructions. The machine readable instructions, when executed by the processor cause the apparatus to partition a natural span of the optical fiber link into multiple sub-spans, each of the multiple sub-spans determined based on chromatic dispersion (CD) equivalence. For each of the multiple sub-spans, the machine executable instructions, when executed by the processor, further cause the apparatus to acquire sub-span function parameters and a sub-span input power indicative of input power at a particular sub-span, the sub-span function parameters including noise variance and correlations between the particular sub-span and others of the multiple sub-spans. When executed by the processor, the machine readable instructions further cause the apparatus to determine the nonlinear impairment of the optical fiber link based on the sub-span input power and the sub-span function parameters acquired for each of the multiple sub-spans.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 2A illustrates various channels in an optical communication system.

FIG. 2B illustrates phase modulation on the signal channel.

FIG. 2C illustrates phase modulation by a neighboring pump channel.

It will be noted that throughout the appended drawings, like features are identified by like reference numerals.

DETAILED DESCRIPTION

Optical signals experience nonlinearity (e.g. nonlinear interference (NLI)) in the fiber, which can lead to degradation in signal quality. As such, modeling of NLI is important for optical link design, quality of transmission (QoT) assessment, etc. and therefore has been intensively studied.

The present disclosure provides a NLI modeling method that can be used for arbitrary links with non-uniform fiber span length (e.g. length of an optical fiber between two amplifiers), mixed fiber types, arbitrary signal format, which can be performed at a faster speed relative to current approaches. According to embodiments, the NLI modeling method can be a sub-span based method. Using the sub-span based method, an optical fiber link is partitioned into sub-spans with small dispersion steps. According to embodiments, any fiber length and fiber type can be expressed by this sub-span based method. Put another way, the method provides versatility as it works for a variety of link types including mixed or non-uniform links. According to embodiments, the sub-span based method can enhance the computation speeds for NLI evaluation (or assessment) and modelling.

Embodiments of the present disclosure can be distinguished in that prior art (e.g. GN models or eGN models) use complicated analytical formulas to calculate NLI which can be computationally intensive as the computations involve multiple integrations (e.g. 3-fold integration). In contrast, embodiments of the present disclosure use off-line simulation to generate parameter tables and use simple summations to calculate NLI (e.g. accumulate nonlinear noise). Moreover, the sub-span based method that is implemented in various embodiments of the present disclosure can improve model flexibility. In various embodiments, the whole-span (or natural span) function parameters can be built from sub-span parameters, thereby taking advantages of both the sub-span based method (e.g. flexibility—one parameter table can be used for a link) and the whole-span based method (e.g. fast computation—many orders of magnitude faster than current GN or eGN models).

Figure 1:
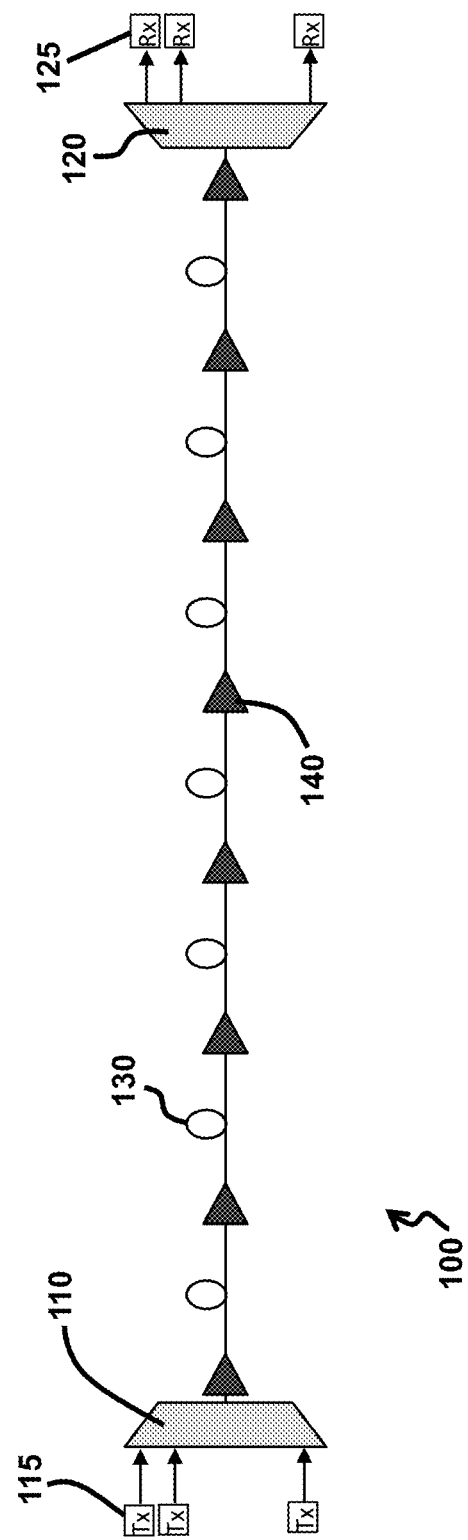
FIG. 1 illustrates a typical point-to-point optical link between optical transceivers.

FIG. 1 illustrates a typical point-to-point optical link 100 between optical transceivers. The point-to-point optical link 100 includes multiple transmitters (Tx) 115, each with a unique wavelength. The wavelengths are multiplexed by the wavelength divisional multiplexing (WDM) multiplexer 110, which may be configured as an arrayed waveguide (AWG) or wavelength selective switch (WSS). The transmission medium is optical fiber 130. Optical amplifiers 140 are used to compensate loss associated with various optical components or optical fiber (spans). The span length (e.g. the length of an optical fiber between two amplifiers) may be as short as less than 1 km, or as long as more than 100 km. The number of spans can range from one to tens or more. Most widely used fiber types are a standard single mode fiber (SSMF) (G.652) and enhanced large effective area fiber (ELEAF) (G.655). On the receiving end, all wavelengths (e.g. channels) are WDM de-multiplexed by the WDM de-multiplexer 120, and received by receivers (Rx) 125.

The point-to-point optical link 100 may be a point-to-point dense wavelength division multiplexing (DWDM) link. In such cases, a typical maximum number of channels or wavelengths can be between for example 80 to 120 with 50 GHz spacing in the conventional band (C-band). The channels are multiplexed by DWDM multiplexer (i.e. WDM multiplexer 110 can be a DWDM multiplexer) and de-multiplexed by DWDM de-multiplexer (i.e. WDM de-multiplexer 120 can be a DWDM de-multiplexer).

Further, regarding optical fiber in mesh optical networks with more advanced reconfigurable optical add/drop multi-plexing (ROADM), channels may be routed to different fibers at ROADM site. Further, channel power can be equalized every few fiber spans, usually by WSS within ROADM site. In addition, chromatic dispersion (CD) may not usually be compensated for a coherent detection system.

In modern optical communication systems, conventional band (C-band) is usually used and long band (L-band) is also commercialized. The C-band wavelengths range approximately from 1530 nm to 1565 nm and may be considered to be the lowest loss wavelength band. The L-band wavelengths range from approximately 1565 nm to 1625 nm and may be considered to be the second lowest loss wavelength band. It is understood that the exact wavelength ranges of the C-band and the L-band can be vendor dependent.

Traditionally, the transmission band is divided into 50 GHz or 100 GHz channels. However, as the band transmission rate exceeds 50 Gbps and the superchannels emerge, wherein the channel spacing has become less rigid. Rather, it is more important that there are a few tens to more than 100 channels in the transmission band, and a variety of channels can experience Kerr nonlinearity, for example in the case of self-phase modulation (SPM), and the other channels co-propagating in the same fiber, in case of cross-phase modulation (XPM). In other words, in the case of SPM, phase modulation can be induced by the signal channel itself, and in case of XPM, phase modulation can be induced by the other channels except for the particular signal channel. It may also be noted that optical fiber Kerr nonlinearity can be a major impairment and thus an efficient model for NLI is needed.

Nonlinear modeling can provide an estimate of nonlinear noises from SPM and XPMs. If SPM and all XPM terms are known, the total nonlinear noise is a sum of SPM and XPMs, because all of the channels are statistically independent as they carry independent data.

The total nonlinear noise power $\sigma_{NLI}^2$ can be calculated as defined in Equation 1 below, where $\sigma_{SPM}^2$ is the nonlinear noise power for SPM, $\sigma_{XPM,ich}^2$ is the nonlinear noise power for XPM induced noise by the channel ich (i.e. channel index ich) and Nch is the number of channels:

$$\sigma_{NLI}^2 = \sigma_{SPM}^2 + \sum_{ich}^{Nch} \sigma_{XPM,ich}^2 \qquad (1)$$

FIG. 2A illustrates various channels in an optical communication system. In an optical link (e.g. optical link 100), there can be a number of channels, and the channel powers can be different. Therefore, the summation of nonlinear noise power can be acquired over all existing channels except the signal channel (e.g. signal channel 210) itself. It may be noted that for convenience, these noises are signal power normalized or signal-to-noise ratio, as is illustrated in FIG. 2A. It may be further noted that each noise term is generated in the optical fiber link (e.g. optical fiber 130), depending on one or more factors, for example the fiber type, fiber length, fiber attenuation coefficient, channel power, signal modulation format, wavelength and the like.

Optical fiber nonlinearity is generated in a distributed manner over the entire transmission link. Optical fiber nonlinearity may be triggered by intensity dependence of the refractive index of the transmission medium or an inelastic-scattering phenomenon. For example, noise generated in different locations may not be independent. With respect to optical fiber nonlinearity, the challenge is to perform an accumulation of NLI noise in an accurate manner.

Kerr nonlinearity is the phase modulation by optical power in the optical fiber. With Kerr nonlinearity, the electrical field becomes $E_s(t)e^{i\phi_{NL}(t)}$, where $E_s(t)$ is the optical electrical field of the signal without Kerr nonlinearity and $\phi_{NL}(t)$ is the instantaneous nonlinear phase. It may be noted that $\phi_{NL}(t)=\gamma I(t)$, where $\gamma$ is the nonlinear coefficient in rad/W/km, and $I(t)$ is the optical intensity/power in Watts, including the signal channel itself and the other channels on the optical fiber.

FIG. 2B illustrates phase modulation on the signal channel 220 itself, referred to as self phase modulation (SPM). For SPM, $P=\overline{I_s(t)}=\overline{|E_s(t)|^2}$ is the average power of the signal channel 220.

FIG. 2C illustrates phase modulation by a neighboring (pump) channel 240, referred to as cross phase modulation (XPM). In XPM, every channel acting as pump channel for each other channel on the optical fiber. For XPM, $P=\overline{I_p(t)}=\overline{|E_p(t)|^2}$ is the average power of the pump channel 240, not including the signal channel 230 itself.

The nonlinear phase can be substantially smaller than 1, therefore $E_s(t)e^{i\phi_{NL}(t)} \approx E_s(t)+E_s(t)i\phi_{NL} \approx E_s(t)+\varepsilon(t)$, where $\varepsilon(t)$ is the normalized distortion to signal due to Kerr nonlinearity, or NLI. The normalized NLI power is proportional to $|\varepsilon E(t)|^2$ or $P^2$, which can be considered as an important scaling law for Kerr NLI.

Figure 3:
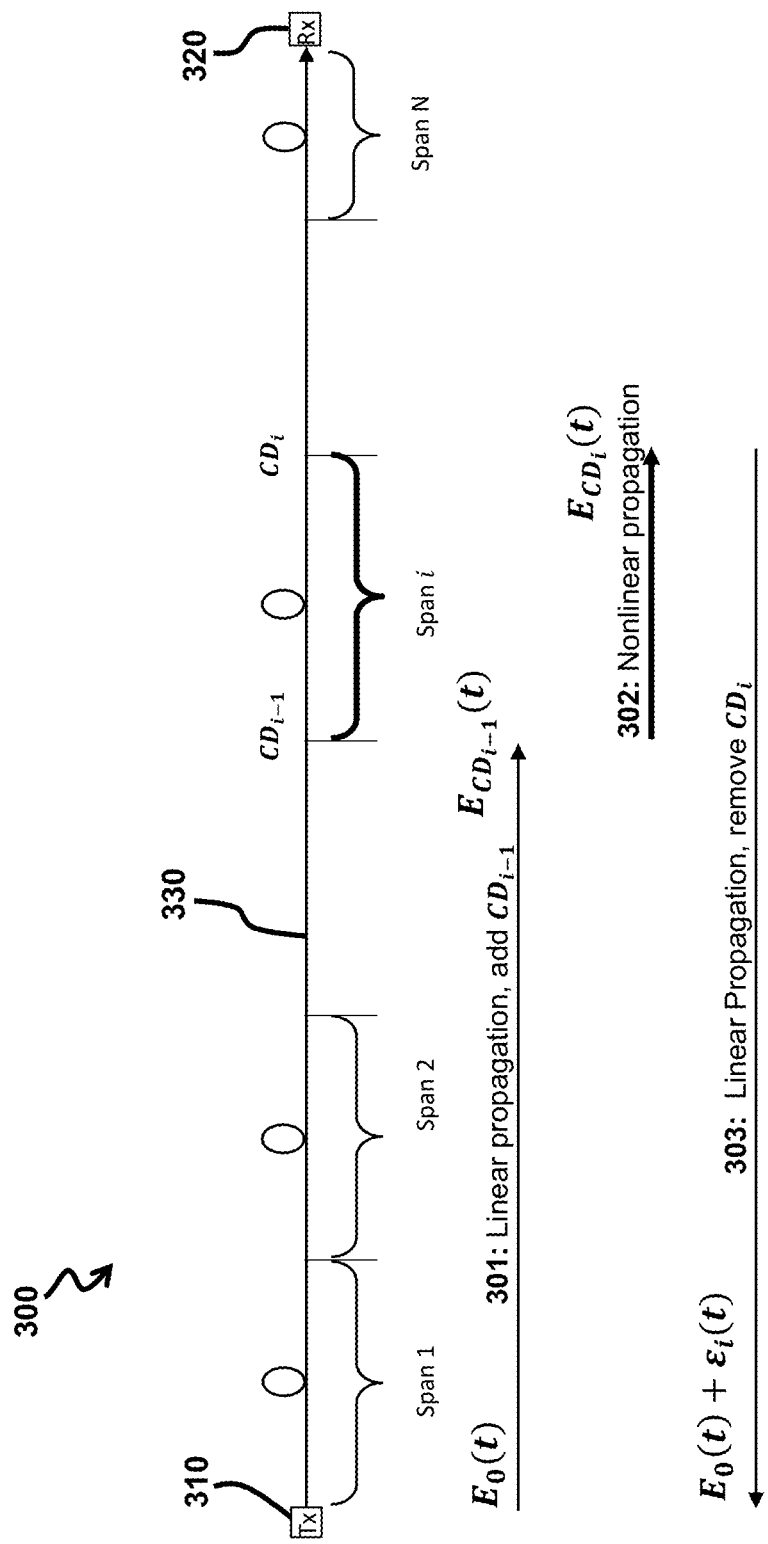
FIG. 3 illustrates simulation of the nonlinear distortion $\varepsilon_1(t)$ in a multiple-span link.

The following defines a semi-analytical model for accumulating NLI noise along a multiple-span link (i.e. span-based method). It may be noted that this process can be applied to both SPM and XPM. FIG. 3 illustrates a simulation of the nonlinear distortion $\varepsilon_1(t)$ from the i th span in a multiple-span link. It may be noted that the simulation can be performed off-line. The multiple-span link 300 includes the Tx 310 and the Rx 320, and the transmission medium between the Tx 310 and the Rx 320 is the optical fiber 330. CD, refers to the accumulated chromatic dispersion (CD) after i spans. $E_0(t)$ refers to the initial optical electrical field at the Tx 310, and for quadrature amplitude modulation (QAM) signal, this can be a complex number. The normalized nonlinear distortion $E_1(t)$ to the electrical field induced by fiber span i can be acquired through steps 301 to 303 as further defined below.

At step 301, the (initial) optical electrical field is linearly propagated to the beginning of span i to obtain waveform $E_{CD_{i-1}}(t)$. This is equivalent to the addition of $CD_{i-i}$. At step 302, the optical electrical field is nonlinearly propagated through span i to obtain the waveform $E_{CD_i}(t)$ which contains the NLI induced in span i. This can be done by performing the classic split-step method. At step 303, the optical electrical field is linearly propagated back to the Tx 310 by applying negative$CD_i$. This is equivalent to the removal of $CD_i$. Step 303 is necessary because, in a coherent detection receiver (e.g. Rx 320), the link dispersion is completely removed in order to obtain the signal waveform at the Tx 310 (plus added noises, NLI, etc.). After step 303, the optical electrical field includes the un-distorted optical field$E_0(t)$, plus the nonlinear interference $\varepsilon_i(t)$ from span i.

The total NLI is the sum of all spans, $$\varepsilon(t) = \sum_{i=1}^{N} \varepsilon_i(t),$$

and therefore the normalized NLI noise (power) is the variance of $\varepsilon(t)$, as is defined in Equation 2.

$$\sigma^2 = \text{var}\left(\sum_{i=1}^{N} \varepsilon_i\right) = \sum_{i=1}^{N} \text{var}(\varepsilon_i) + \sum_{i=1}^{N}\sum_{j=1, j\neq i}^{N} \text{var}(\varepsilon_i, \varepsilon_j) \quad (2)$$

Figure 4:
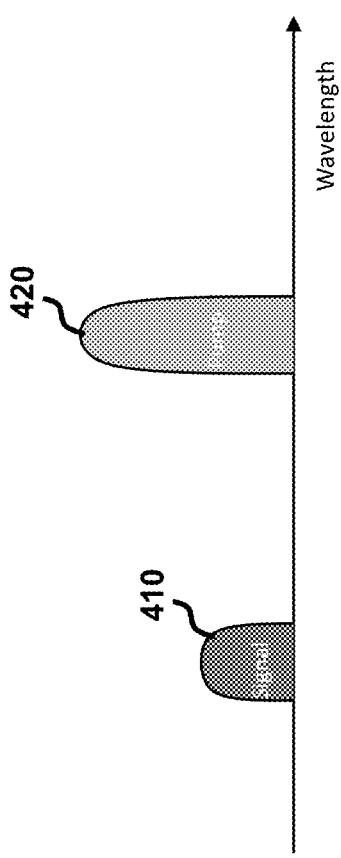
FIG. 4 illustrates the power of the signal channel and the pump channel, respectively, for simulating cross-phase modulation (XPM) induced nonlinear distortion $\varepsilon_1(t)$.

When simulating SPM $\varepsilon_i$, the optical electrical field contains only the signal channel. On the other hand, when simulating XPM$\varepsilon_i$, the optical electrical field contains the signal channel (e.g. signal channel 410) and the pump channel (e.g. pump channel 420), as illustrated in FIG. 4. FIG. 4 illustrates power of the signal channel 410 and the pump channel 420, respectively, in simulating XPM induced nonlinear distortion$\varepsilon_i(t)$. As shown in FIG. 4, the pump channel 420 is separate from the signal channel 410 with a certain spacing (in terms of wavelengths). The power of the signal channel 410 is significantly lower than the power of the pump channel 420 in simulating XPM induced nonlinear distortion$\varepsilon_i(t)$. It should be noted that the signal power is set to a lower level (e.g. 30 dB lower) than the pump power, in order to obtain the pure XPM effect.

The total NLI is the sum of all spans, $$\varepsilon(t) = \sum_{i=1}^{N} \varepsilon_i(t),$$

and therefore the normalized NLI noise (power) is the variance of $\varepsilon(t)$, as is illustrated below in Equation 3.

$$\sigma^2 = \sum_{i=1}^{N} \text{var}(\varepsilon_i) + \sum_{i=1}^{N}\sum_{j=1}^{N} \text{var}(\varepsilon_i, \varepsilon_j) = \sum_{i=1}^{N} \sigma_i^2 + \sum_{i=1}^{N}\sum_{j=1, j\neq i}^{N} \sigma_i \sigma_j \rho_{i,j} \quad (3)$$

Regarding Equation 3, $\sigma_i^2 \equiv \text{var}(\varepsilon_1)$ is the normalized noise generated in span i, and $\rho_{i,j}$ is the normalized covariance between span i and j. It should be also noted that $$\rho_{i,j} \equiv \frac{1}{\sigma_i \sigma_j} \text{var}(\varepsilon_i, \varepsilon_j).$$

Further regarding Equation 3, the first term $$\sum_{i=1}^{N} \sigma_i^2$$

is the sum or noise generated in each span, the second term $$\sum_{i=1}^{N}\sum_{j=1}^{N} \sigma_i \sigma_j \rho_{i,j}$$

accounts for the correlation between the noises in different spans (e.g. span i and j, i≠A. It is understood that noise in different spans are partially coherent.

It is noted that $\sigma_i^2 \equiv P_i^2 \kappa_i$, where $P_i$ is the pump input power (in case of SPM, the pump channel is the same as signal channel) in span i, and $\kappa_i$ is the normalized noise generated in span i by unit power. Therefore, Equation 4 can be obtained.

$$\sigma^2 = \sum_{i=1}^{N} P_i^2 \kappa_i + \sum_{i=1}^{N} \sum_{j=1, j \neq i}^{N} P_i P_j \sqrt{\kappa_i \kappa_j} \, \rho_{i,j} \quad (4)$$

Equation 4 is used to calculate the accumulated noise in a multiple-span link with arbitrary fiber input power. Equation 4 applies to SPM, as well as every XPM term. It is noted that in the case of SPM, the pump channel is the same as signal channel. It is further noted that $\kappa_i$ and $\rho_{i,j}$ can be obtained by simulation, and may be stored, for example in a database, for future use. As the number of spans N may typically be considered to be less than 30, the calculation is can fast (less than a millisecond and thus in the microsecond regime). $\kappa_i$ and $\rho_{i,j}$ are functions of cumulated dispersion up to the ith and jth span, and are functions of the fiber span parameters (e.g. dispersion coefficient, length, loss coefficient, effective area, etc.). It is noted that this span-based approach can be very useful for a uniform span link. However, for a non-uniform span link (e.g. where span length or fiber type can be different over the span), the span-based approach is not practical as there are too many possible combinations. Despite the fast speed in computation, the span-based approach requires a significantly large parameter table. Therefore, it is desired to find a simplified method for the determination of NLI for a non-uniform span link. According to embodiments, the simplified method can have a limited table for $\kappa_i$ and $\rho_{i,j}$ (e.g. for a limited number of combinations), while further being able to model a variety of links (e.g. uniform links and non-uniform span links).

The present disclosure provides a nonlinear noise accumulation method that is independent of fiber type and fiber length. According to embodiments, for this independence, the natural fiber span is partitioned into smaller sub-spans, each sub-span determined based on chromatic dispersion (CD) equivalence (e.g. a natural span of the optical fiber link is partitioned into smaller sub-spans with substantially equal dispersion step size), rather than based on fiber length. Put another way, an optical fiber link is divided into small and equal step sizes (or equal amounts) of (accumulated) chromatic dispersion (CD) thereby removing the fiber type dependence in relation to the parameters K and p relating to the link condition.

Figure 5:
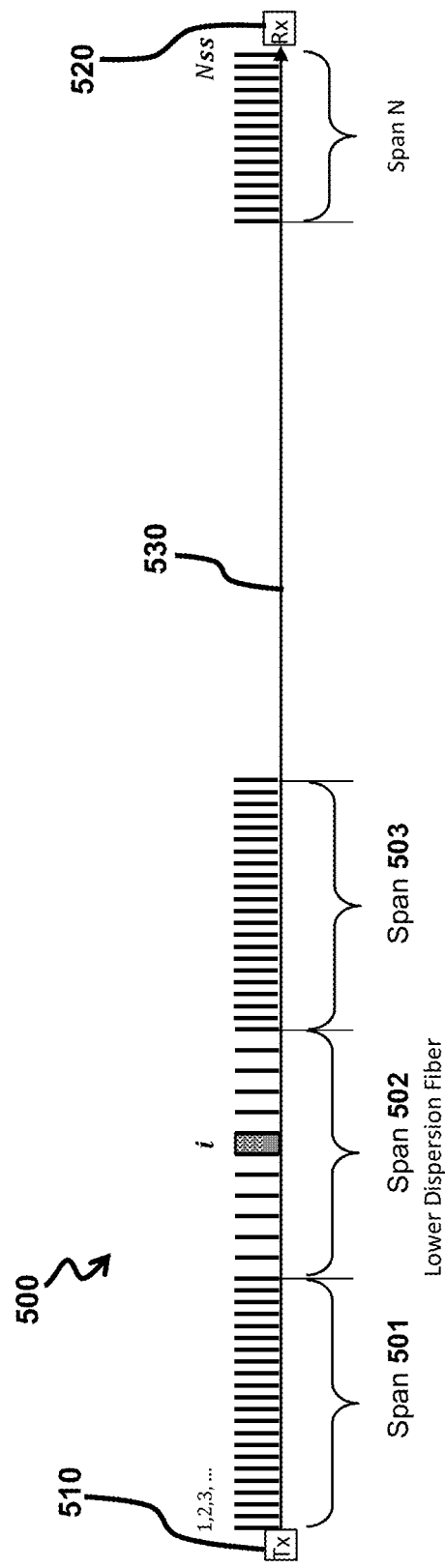
FIG. 5 illustrates an optical fiber link being divided into sub-spans with small dispersion steps, in accordance with embodiments of the present disclosure.

According to embodiments, instead of having the natural spans (e.g. whole span, unpartitioned optical fiber span), an optical fiber link is divided into sub-spans with small dispersion steps, as illustrated in FIG. 5. The equation used to calculate the accumulated noise for sub-span based approach remains same as discussed above with respect to calculation of the accumulated noise for span-based approach, however the index i is used to defined the sub-span, and the total number of sub-spans Nss is used. Equation 5 defines the accumulated NLI over an optical link when calculated using the method according to embodiments of the present disclosure.

$$\sigma^2 = \sum_{i=1}^{Nss} P_i^2 \kappa_i + \sum_{i=1}^{Nss} \sum_{j=1, j \neq i}^{Nss} P_i P_j \sqrt{\kappa_i \kappa_j} \, \rho_{i,j} \quad (5)$$

where $P_i$ is the input power of the ith sub-span (i.e. input power at the ith sub-span), $\kappa_i$ is the normalized noise variance or function of dispersion in sub-span i, $\rho_{i,j}$ is the correlation between sub-span i and j. $P_i$ and $\kappa_i$ may be collectively referred to as sub-span function parameters. In some embodiments, the sub-span function parameters further include other factors that can affect calculation of accumulated NLI.

FIG. 5 illustrates an optical fiber link being divided into sub-spans with small dispersion steps, in accordance with embodiments of the present disclosure. The multiple-span link 500 includes the Tx 510 and the Rx 520, and the transmission medium between the Tx 510 and the Rx 520 is the optical fiber 530.

According to embodiments, each sub-span may have a different length. Generally, the fiber with a lower dispersion coefficient can have a larger sub-span length. Having further regard to FIG. 5, for the optical fiber link 500, the span 502 has a lower dispersion coefficient than the span 501 and the span 503. As such, the span 502 has a greater 'sub-span' length than the span 501 and the span 503, as illustrated. With a sufficiently small sub-span size, the sub-span based method as discussed in the instant disclosure, can be applied to a variety of non-uniform span lengths and any fiber types (e.g. any mixed fiber types).

According to embodiments, the power at the ith sub-span input, $P_i$, can be calculated using the input power of the span and the fiber attenuation coefficient. In fact, the power of all channels can be calculated even with the stimulated Raman scattering (SRS) effect.

In various embodiments, different fiber loss coefficients can be taken into consideration by calculating $P_i$ using the fiber loss coefficient. On the other hand, in the whole-span based method, fiber loss affects the noise variance, $\kappa$, as well as the correlation, $\rho$. According to embodiments, the fiber effective area can also be accounted for by properly scaling $\kappa$, and thus the method for determination (e.g. computation) of NLI of an optical fiber according to the instant application can be completely de-coupled from fiber type.

Generally speaking, the sub-span based method of the instant application, removes elements, such as the fiber type, fiber length, fiber attenuation, and SRS, from the parameters $\kappa$ and $\rho$. In various embodiments, $\kappa$ and $\rho$ may only depend on chromatic dispersion (CD) and signal modulation format.

According to embodiments, the covariance matrix can be calculated, and the derivation of the covariance matrix can be also performed in a simple manner. The covariance can be considered to be the correlation between two CDs and can essentially be zero except for small $|CD_i - CD_j|$. For XPM, the correlation length in CD is approximately computed by $$CD_{corr} = \frac{T}{\sqrt{\Delta \lambda^2 + \Delta \lambda_s^2}} \, \text{ps/nm},$$

where T is the signal symbol pulse width, $\Delta \lambda$ is the signal-pump wavelength difference, and $\Delta \lambda_s$ is the signal spectrum width. Given the correlation length in CD as defined above, the correlation can be obtained by $$\rho_{i,j} = \exp\left(-2 \frac{|CD_i - CD_j|^2}{CD_{corr}^2}\right).$$

According to embodiments, XPM induced nonlinear distortion can decrease as the space between the signal channel and the pump channel increases (e.g. the signal channel and the pump channel are more separated), and the relationship of nonlinear distortion with the covariance can be inferred in the sub-span method of the instant application. In various embodiments, the storage of a covariance matrix for each signal-pump spacing (i.e. spacing between the signal channel and the pump channel) may not be required.

According to embodiments, the sub-span based method makes the nonlinear noise accumulation flexible. However, the number of sub-spans can be much larger than the number of natural spans (e.g. whole span, unpartitioned optical fiber span). For example, if the sub-span step is 10 ps/nm, then the corresponding SSMF (with dispersion coefficient of about 16.7 ps/(nm km)) length is about 10/16.7≈0.6 km. In other words, there are more than 100 sub-spans in an 80 km SSMF span. The accumulation calculation therefore can be significantly more time consuming.

However, the time consumption for the accumulation calculation would not be a problem in most cases. According to embodiments, most computation is with the double summation, which involves the p matrix. As the p matrix is mostly zero except for the data points in the neighborhood of the diagonal of the matrix (i.e. $\rho_{i,j}$ is non-zero only for a small $|CD_i-CD_j|$, the double summation can be performed only for a small number of combinations, and thus will be greatly accelerate the calculations, reducing the time required to perform the accumulation calculation, in most cases. For example, for a 20 span SSMF link, the total NLI can be calculated in milliseconds (e.g. approximately 1-2 ms on a typical personal computer), which is can be significantly faster than what would be necessary when using GN/eGN models. In some embodiments, the total NLI may be calculated even faster, for example if computation is desired for online routing and design tools, as the model can be called hundreds of thousands of times.

Figure 6:
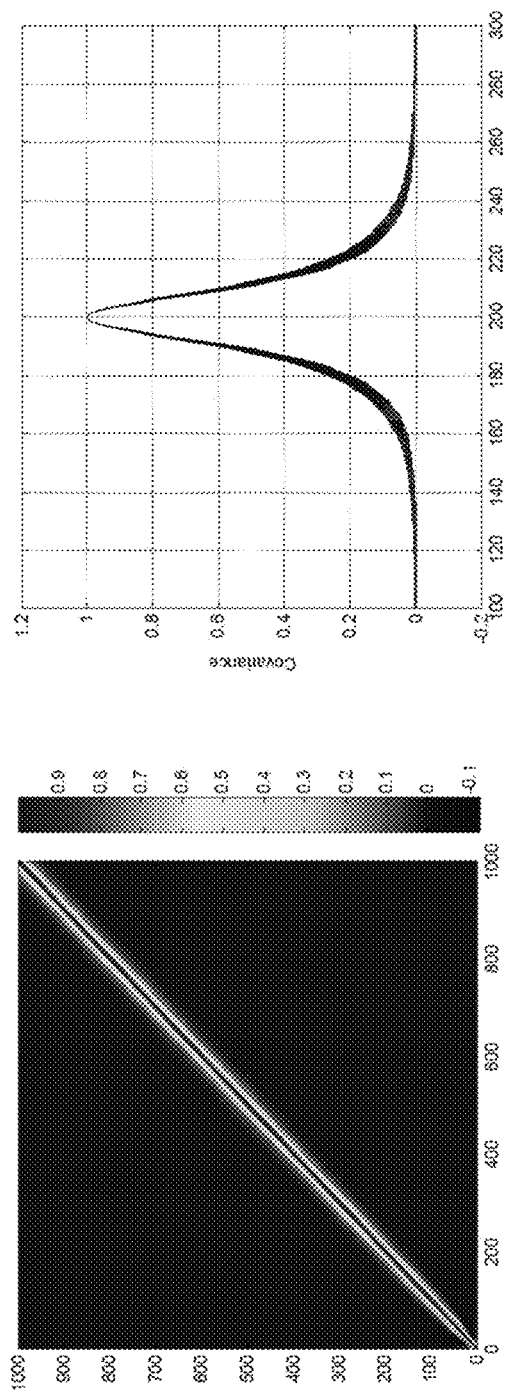
FIG. 6 illustrates a covariance matrix ($\rho$ matrix) for self-phase modulation (SPM), which is used for calculation of normalized nonlinear interference (NLI) noise, in accordance with embodiments of the present disclosure.
Figure 7:
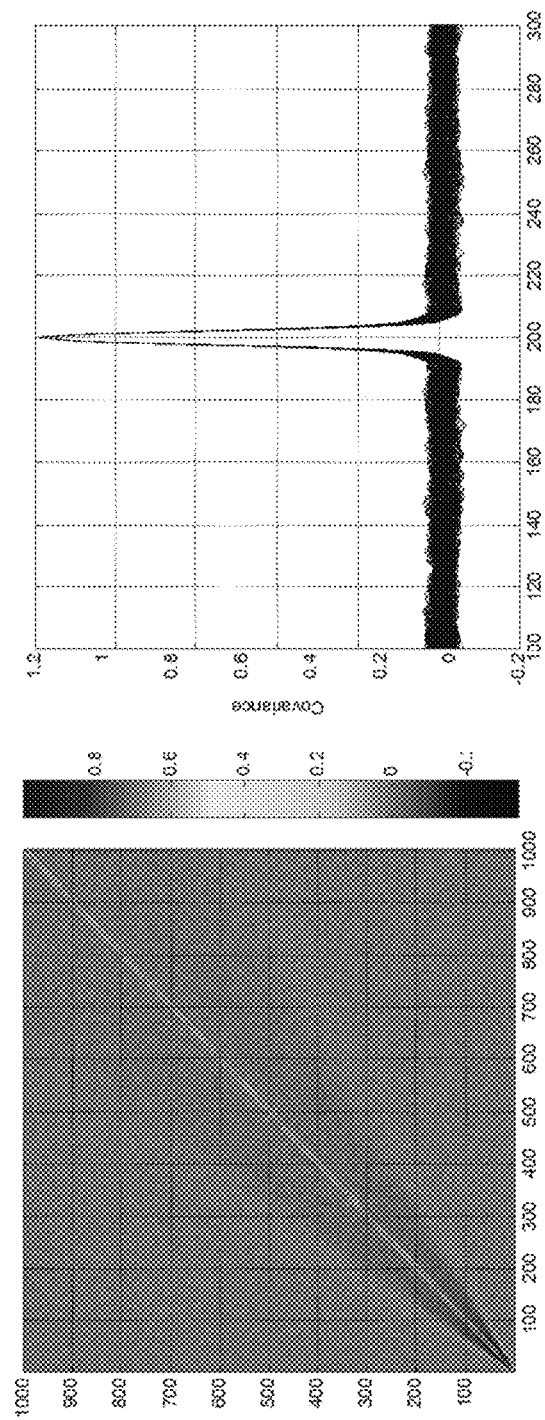
FIG. 7 illustrates a covariance matrix ($\rho$ matrix) for XPM with a pump channel 50 GHz from the signal channel, which is used for calculation of normalized NLI noise, in accordance with embodiments of the present disclosure.

FIG. 6 illustrates a covariance matrix (ρ matrix) of 28 Gb 100G quadrature phase shift keying (QPSK) for SPM, which is used for the calculation of normalized NLI noise power, in accordance with embodiments of the present disclosure. It is clear from FIG. 6 that outside of the close proximity of the diagonal of the matrix, the values are substantially zero. FIG. 7 illustrates a covariance matrix (ρ matrix) of 28 Gb 100G quadrature phase shift keying (QPSK) for XPM with pump channel 50 GHz from the signal channel, which is used for calculation of normalized NLI noise power, in accordance with embodiments of the present disclosure. The unit of the axis used in FIGS. 6 and 7 is 1 km SSMF fiber (i.e. 1 km step size in SSMF) or 16.7 ps/nm dispersion. Referring to FIGS. 6 and 7, the right figures, all curves are shifted to be centered at 200.

According to embodiments, the whole-span (natural span) function parameters κ and ρ may be built from the sub-span parameters κ and ρ so that both of the flexibility of the sub-span based method of the present disclosure and the faster computation speed of the whole-span based method can be adopted. It may be noted that parameter κ is a parameter indicative of noise and parameter ρ is a parameter indicative of correlation. It may be also noted that the sub-span parameters κ and ρ can be obtained through simulations and the obtained parameters can be saved in, for example, a database for use during computations.

Figure 8:
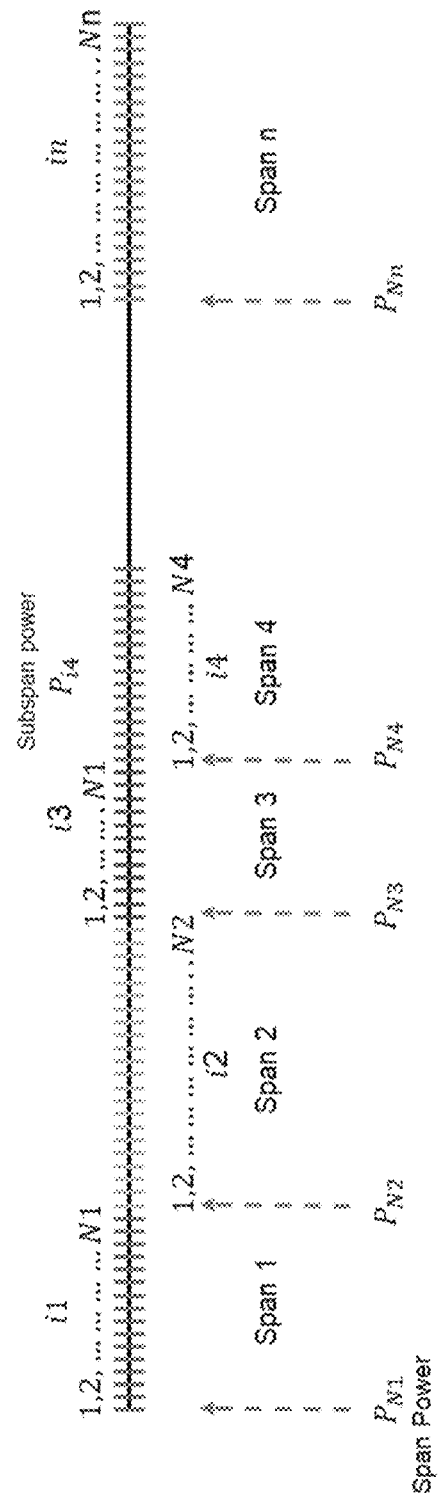
FIG. 8 illustrates a conversion from a sub-span to a whole-span, in accordance with embodiments of the present disclosure.

FIG. 8 illustrates a conversion from sub-span method to a whole-span method, in accordance with embodiments of the present disclosure. As illustrated in FIG. 8, according to embodiments, each natural span (e.g. unpartitioned optical fiber span such as span 1, span 2, span 3 ... span N) can be divided into sub-spans with equal dispersion step size (e.g. chromatic dispersion (CD) equivalence), but irrespective of the fiber length.

Having regard to FIG. 8 and the following equations, the following notations are used wherein: P is the input power; CD is the accumulated chromatic dispersion; N is the number of natural spans; nK is the number of sub-spans of the $K^{th}$ natural span; $\varepsilon_K$ is the the nonlinear distortion induced by the natural span K; and $E_{iK}$ is the nonlinear distortion induced by the $i^{th}$ sub-span of the natural span K. Having further regard to the notation, the single index (1, 2, 3 ... K N) represents natural spans and the dual index (e.g. 11, 12 ... 1K ... 1N) represents sub-spans. Specifically, the first index of the dual index represents sub-spans and the second index of the dual index represents natural spans. For example, $P_K$ would be the input power at the $K^{th}$ natural span (i.e. a natural span input power for the $K^{th}$ natural span) and $Pi_K$ would be the input power at the $i^{th}$ sub-span of the $K^{th}$ natural span.

According to embodiments, for the conversion from sub-span to whole-span, the sub-span accumulation equation is re-written in the whole-span fashion, as follows.

$$\sigma^2 = \text{var}\left(\sum_{i1=1}^{N1} \varepsilon_{i1} + \sum_{i2=1}^{N2} \varepsilon_{i2} + \ldots + \sum_{in=1}^{Nn} \varepsilon_{in}\right)$$

where N1, N2 ... Nn are the number of sub-spans in natural span 1, 2 ... n, respectively.

For example, for the $K^{th}$ whole-span (i.e. natural span) and the $L^{th}$ whole-span, where K and L are not equal and less than or equal to N, the accumulated noise for the two whole-span can be calculated as follows.

$$\text{var}\left(\sum_{iK=1}^{nK} \varepsilon_{iK} + \sum_{iL=1}^{nL} \varepsilon_{iL}\right) = \text{var}\sum_{iK=1}^{nK} \varepsilon_{iK} + \text{var}\sum_{iL=1}^{nL} \varepsilon_{iL} + \sum_{iK=1}^{nK}\sum_{iL=1}^{nL} \text{var}(\varepsilon_{iK}, \varepsilon_{iL}) =$$

$$\sum_{iK=1}^{nK} \sigma_{iK}^2 + \sum_{iL=1}^{nL} \sigma_{iL}^2 + \sum_{iK=1}^{nK}\sum_{iL=1}^{nL} \sigma_{iK}\sigma_{iL}\rho_{iK,iL}$$

$(K \neq L)$

Here, $\rho_{iK,iL}$ is the covariance of sub-spans iK and iL and can be further expressed as the following equation.

$$\rho_{iK,iL} = \frac{\text{var}(\varepsilon_{iK}, \varepsilon_{iL})}{\sqrt{\text{var}(\varepsilon_{iK})\text{var}(\varepsilon_{iL})}} = \frac{\text{var}(\varepsilon_{iK}, \varepsilon_{iL})}{\sigma_{iK}, \sigma_{iL}}$$

Therefore, $$\text{var}\left(\sum_{iK=1}^{nK} \varepsilon_{iK} + \sum_{iL=1}^{nL} \varepsilon_{iL}\right) =$$

$$\sum_{iK=1}^{nK} P_{iK}^2 \kappa_{iK} + \sum_{iL=1}^{nL} P_{iL}^2 \kappa_{iL} + \sum_{iK=1}^{nK}\sum_{iL=1}^{nL} P_{iK} P_{iL} \sqrt{\kappa_{iK}\kappa_{iL}}\, \rho_{iK,iL} =$$

$$P_K^2 \kappa_K + P_L^2 \kappa_L + P_K P_L \sqrt{\kappa_K \kappa_L}\, \rho_{K,L}$$

It may be noted that:

$$\sum_{iK=1}^{nK} \sum_{iL=1}^{nL} \text{var}(\varepsilon_{iK}, \varepsilon_{iL})$$

equates to:

$$P_K P_L \sqrt{\kappa_K \kappa_L} \rho_{K,L}.$$

The whole-span (natural span) model can be derived from the sub-span model using the following parameters:

$$\kappa_K \equiv \sum_{iK=1}^{nK} \frac{P_{iK}^2}{P_K^2} \kappa_{iK} + \sum_{iK=1}^{nK} \sum_{jK=1}^{nK} \frac{P_{iK} P_{jK}}{P_K^2} \sqrt{\kappa_{iK} \kappa_{jK}} \, \rho_{iK,jK}, \, jK \neq iK$$

$$\rho_{K,L} \equiv \frac{1}{\sqrt{\kappa_K \kappa_L}} \sum_{iK=1}^{nK} \sum_{iL=1}^{nL} \frac{P_{iK} P_{iL}}{P_K P_L} \sqrt{\kappa_{iK} \kappa_{iL}} \, \rho_{iK,iL}$$

Wherein when calculating $\kappa_K$ and $\rho_{K,L}$, only the power ratio (loss), such as $$\frac{P_{iK}^2}{P_K^2}, \frac{P_{iK} P_{jK}}{P_K^2} \text{ and } \frac{P_{iK} P_{iL}}{P_K P_L},$$

is needed. As such the absolute power of sub-span(s) is not required.

According to embodiments, the whole-span (natural span) function parameter calculation does not require channel input power into the fiber.

Based on the above, the accumulation noise for the whole-span is provided by the following formula:

$$\sigma^2 = \sum_{K=1}^{N} P_K^2 \kappa_K + \sum_{K=1}^{N} \sum_{L=1}^{N} P_K P_L \sqrt{\kappa_K \kappa_L} \, \rho_{K,L}, \, K \neq L$$

wherein the underlining parameters derived from the sub-span parameters, as follows.

$$\kappa_K \equiv \sum_{iK=1}^{nK} \frac{P_{iK}^2}{P_K^2} \kappa_{iK} + \sum_{iK=1}^{nK} \sum_{jK=1}^{nK} \frac{P_{iK} P_{jK}}{P_K^2} \sqrt{\kappa_{iK} \kappa_{jK}} \, \rho_{iK,jK}, \, jK \neq iK$$

$$\rho_{K,L} \equiv \frac{1}{\sqrt{\kappa_K \kappa_L}} \sum_{iK=1}^{nK} \sum_{iL=1}^{nL} \frac{P_{iK} P_{iL}}{P_K P_L} \sqrt{\kappa_{iK} \kappa_{iL}} \, \rho_{iK,iL}$$

Figure 9:
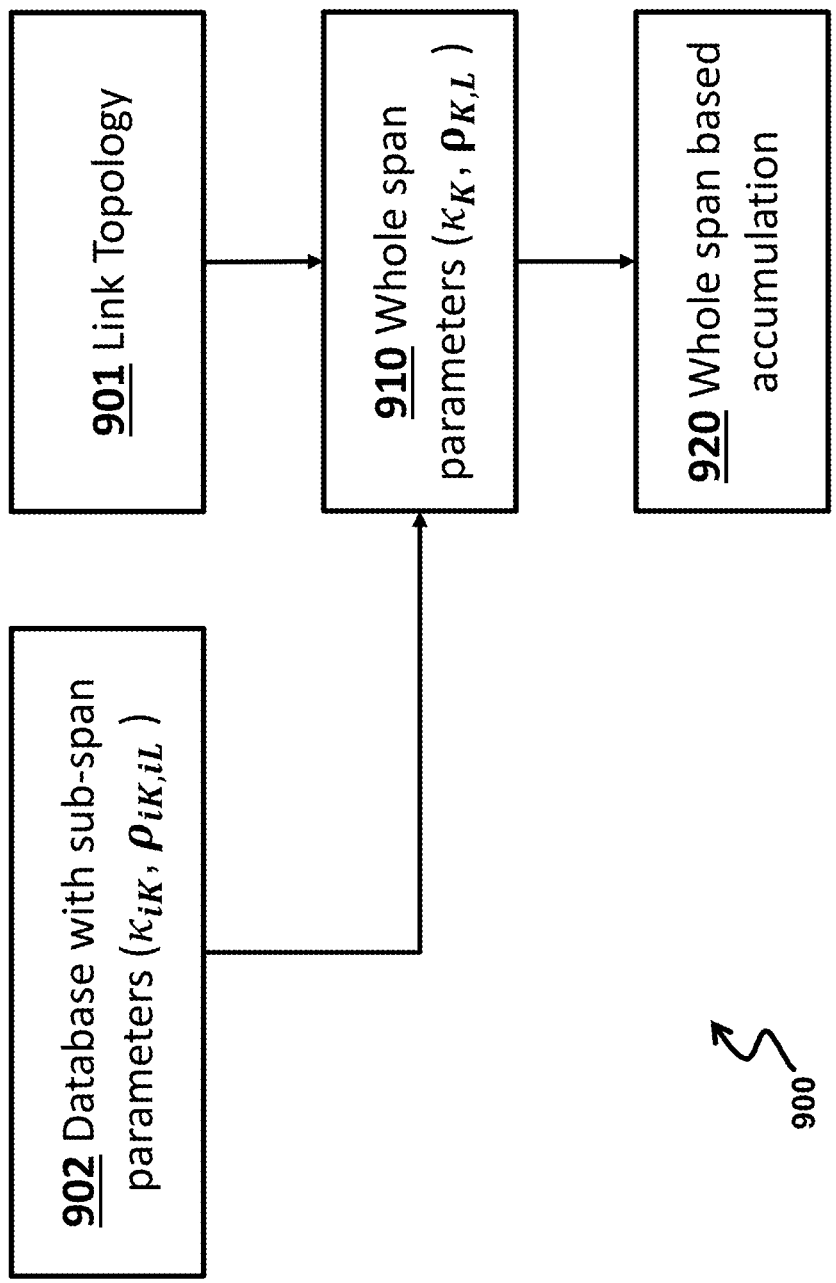
FIG. 9 illustrates, in a flow diagram, a procedure for calculating the accumulated noise using the sub-span to a whole-span conversion, in accordance with embodiments of the present disclosure.

FIG. 9 illustrates, in a flow diagram, a procedure 900 for calculating the accumulated noise using the sub-span to whole-span conversion, in accordance with embodiments of the present disclosure. According to embodiments, given the link conditions, the whole-span (natural span) function parameters can be built from sub-span parameters, thereby taking advantages of both the sub-span based method (e.g. providing flexibility as one parameter table can be used for any link) and the whole-span based method (e.g. providing fast computation).

At step 910, the whole-span (natural span) function parameters (i.e. $\kappa_K, \rho_{K,L}$) can be dynamically created once the link topology 901 is provided. The whole-span (natural span) function parameters (i.e. $\kappa_K, \rho_{K,L}$) can be dynamically computed using the sub-span parameters (i.e. $\kappa_{iK}, \rho_{iK,iL}$) derived from the sub-span parameter database 902, as illustrated above. In some embodiments, finer sub-span steps can be used because the conversion from the sub-span to whole-span can be performed (only) once. The whole-span (natural span) function parameters $\kappa_K$ and $\rho_{K,L}$ can be obtained as follows:

$$\kappa_K \equiv \sum_{iK=1}^{nK} \frac{P_{iK}^2}{P_K^2} \kappa_{iK} + \sum_{iK=1}^{nK} \sum_{jK=1}^{nK} \frac{P_{iK} P_{jK}}{P_K^2} \sqrt{\kappa_{iK} \kappa_{jK}} \, \rho_{iK,jK}, \, jK \neq iK$$

$$\rho_{K,L} \equiv \frac{1}{\sqrt{\kappa_K \kappa_L}} \sum_{iK=1}^{nK} \sum_{iL=1}^{nL} \frac{P_{iK} P_{iL}}{P_K P_L} \sqrt{\kappa_{iK} \kappa_{iL}} \, \rho_{iK,iL}$$

At step 920, the accumulated noise is calculated based on the whole-span (natural span) function parameters $\kappa_K$ and $\rho_{K,L}$ obtained in step 910. Step 920 the whole span based acumination can be expressed as follows:

$$\sigma^2 = \sum_{K=1}^{N} P_K^2 \kappa_K + \sum_{K=1}^{N} \sum_{L=1}^{N} P_K P_L \sqrt{\kappa_K \kappa_L} \, \rho_{K,L}, \, K \neq L$$

Figure 10:
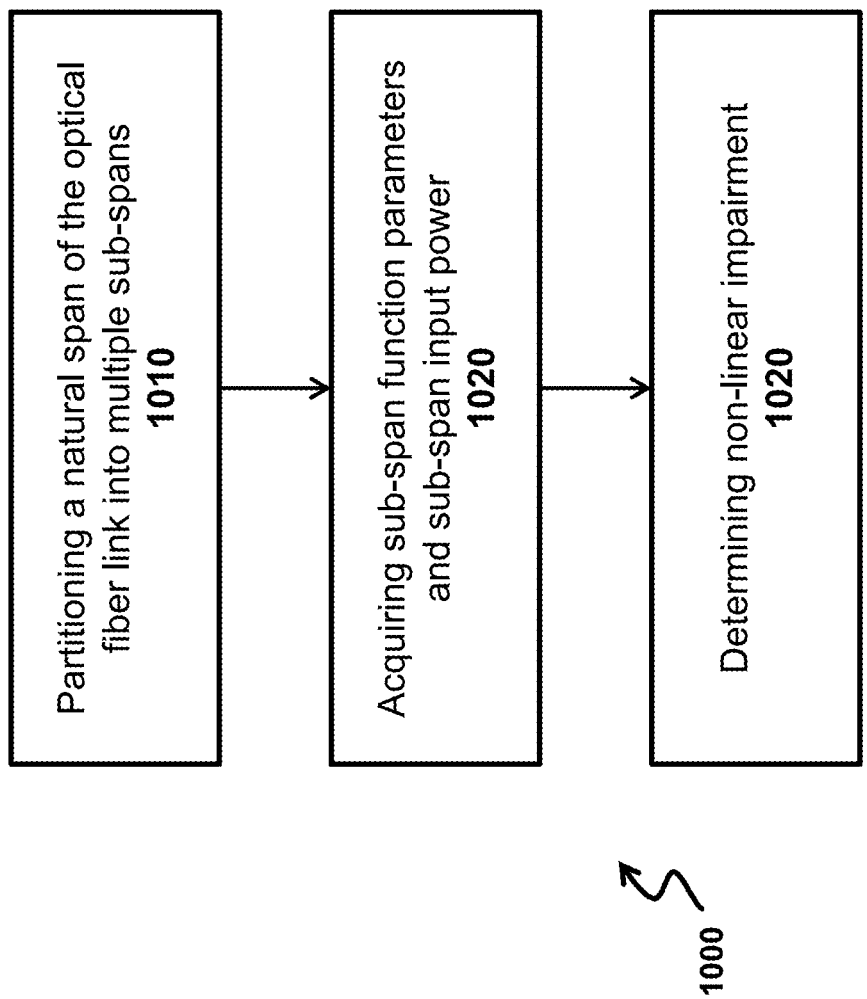
FIG. 10 illustrates, in a schematic diagram, an electronic device in accordance with embodiments of the present disclosure.

FIG. 10 illustrates a method for evaluating (or assessing) nonlinear impairment of an optical fiber link, in accordance with embodiments of the present disclosure. The method includes partitioning 1010 a natural span of the optical fiber link into multiple sub-spans, each of the multiple sub-spans determined based on chromatic dispersion (CD) equivalence. For example, a natural span of the optical fiber link is partitioned into smaller sub-spans with substantially equal step sizes (or equal amounts) of (accumulated) chromatic dispersion (CD), rather than based on fiber length. The method further includes for each of the multiple sub-spans, acquiring 1020 sub-span function parameters and a sub-span input power indicative of input power at a particular sub-span (e.g. input power at the ith sub-span that is a portion of the natural span (whole span)). The sub-span function parameters include noise variance and correlations between the particular sub-span (e.g. ith sub-span that is divided from the natural span (whole span)) and others of the multiple sub-spans. The method further includes determining 1020 the nonlinear impairment of the optical fiber link based on the sub-span input power and the sub-span function parameters acquired for each of the multiple sub-spans. In various embodiments, the nonlinear impairment can be determined by calculating the accumulated NLI over an optical link according to Equation 5 presented above.

According to some embodiments, the step of determining the nonlinear impairment of the optical fiber link includes acquiring natural span function parameters based on the sub-span input power and the sub-span function parameters acquired for each of the multiple sub-spans and determining the nonlinear impairment of the optical fiber link based on the natural span function parameters and a natural span input power indicative of input power of the natural span.

According to some embodiments, the nonlinear impairment of the optical fiber link is evaluated or assessed independently from fiber type, fiber length, fiber attenuation and stimulated Raman scattering (SRS) associated with the optical fiber link. According to some embodiments, the noise variance and correlations between the particular sub-span and others of the multiple sub-spans depends on CD and signal modulation format.

According to some embodiments, the sub-span function parameters acquired for each of the multiple sub-spans are saved in a database. According to some embodiments, at least some of the multiple sub-spans have different lengths. According to some embodiments, the input power of each of the multiple sub-spans is acquired using input power of the natural span and a fiber attenuation coefficient.

According to some embodiments, the natural span function parameters are acquired based on link topology associated with the optical fiber link. According to some embodiments, the natural span function parameters are acquired based on a power ratio between the sub-span input power and the natural span input power indicative of input power of the natural span. According to some embodiments, the natural span function parameters are acquired without absolute values of the sub-span input power and the natural span input power.

Figure 11:
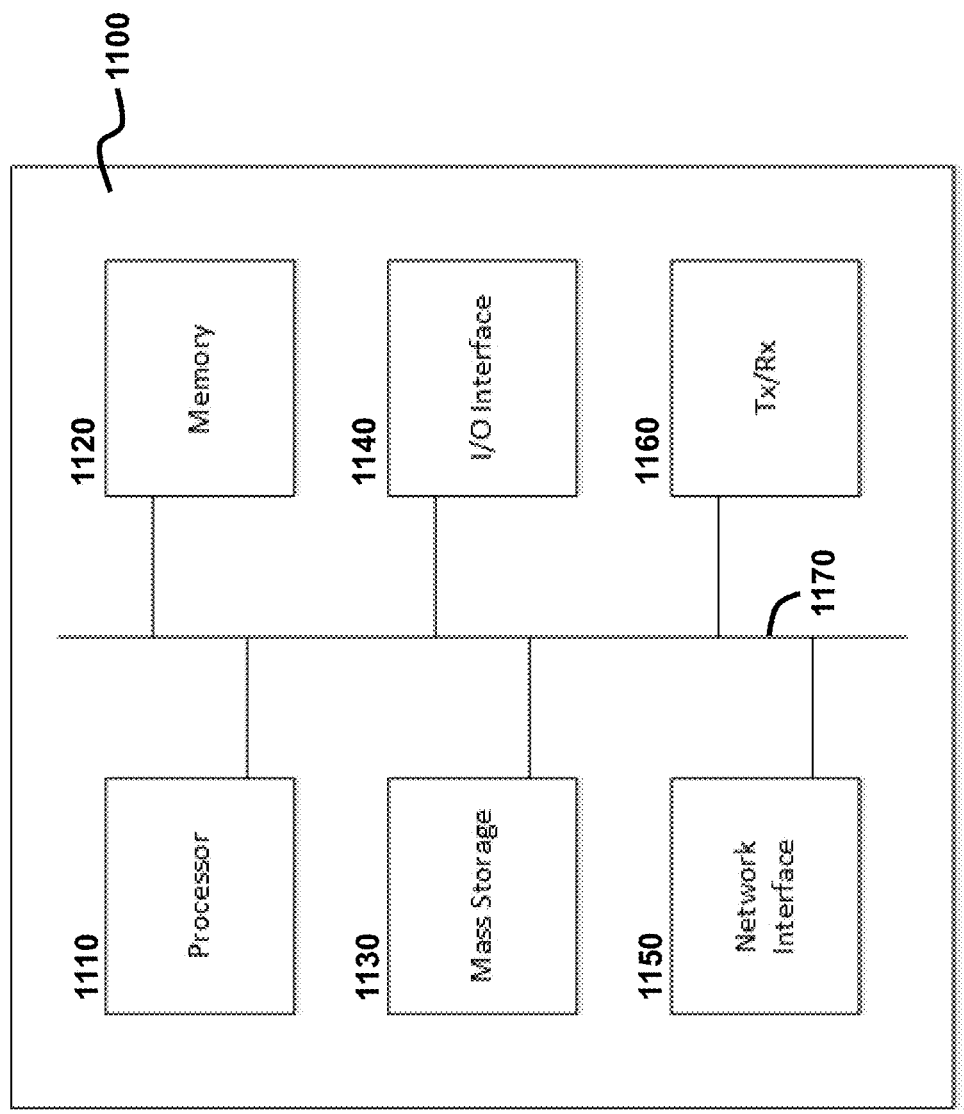
FIG. 11 is a schematic diagram of an electronic device in accordance embodiments of the present disclosure.

FIG. 11 is a schematic diagram of an electronic device 1100 that may perform any or all of operations of the above methods and features explicitly or implicitly described herein, according to different embodiments of the present disclosure. For example, a dedicated hardware capable of executing instructions for operation of the above methods and features may be configured as electronic device 1100. Further, network devices supporting dense wavelength division multiplexing (DWDM) may be configured as electronic device 1100. Further, a computer equipped with network function may be configured as electronic device 1100. The electronic device may be a mobile device or a device forming part of a cell or base station, a radio access node, control function, infrastructure, or other device in a wireless communication access network or core network.

As shown, the device includes a processor 1110, such as a central processing unit (CPU) or specialized processors such as a graphics processing unit (GPU) or other such processor unit, memory 1120, non-transitory mass storage 1130, I/O interface 1140, network interface 1150, and a transceiver 1160, all of which are communicatively coupled via bi-directional bus 1170. According to certain embodiments, any or all of the depicted elements may be utilized, or only a subset of the elements. Further, the device 1100 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 1120 may include any type of non-transitory memory such as static random access memory (SRAM), dynamic random access memory (DRAM), synchronous DRAM (SDRAM), read-only memory (ROM), any combination of such, or the like. The mass storage element 1130 may include any type of non-transitory storage device, such as a solid state drive, hard disk drive, a magnetic disk drive, an optical disk drive, USB drive, or any computer program product configured to store data and machine executable program code. According to certain embodiments, the memory 1120 or mass storage 1130 may have recorded thereon statements and instructions executable by the processor 1110 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method for evaluating nonlinear impairment of an optical fiber link, the method comprising:
partitioning a natural span of the optical fiber link into multiple sub-spans, each of the multiple sub-spans determined based on chromatic dispersion (CD) equivalence;

for each of the multiple sub-spans, acquiring sub-span function parameters and a sub-span input power indicative of input power at a particular sub-span, the sub-span function parameters including noise variance and correlations between the particular sub-span and others of the multiple sub-spans; and determining the evaluation of nonlinear impairment of the optical fiber link based on the sub-span input power and the sub-span function parameters acquired for each of the multiple sub-spans;

wherein the nonlinear impairment of the optical fiber link is evaluated independently from fiber type, fiber length, fiber attenuation and stimulated Raman scattering (SRS) associated with the optical fiber link; and wherein the noise variance and correlations between the particular sub-span and others of the multiple sub-spans depends on CD and signal modulation format.

2. The method of claim 1, wherein the sub-span function parameters acquired for each of the multiple sub-spans are saved in a database.

3. The method of claim 1, wherein the natural span function parameters are acquired based on link topology associated with the optical fiber link.

4. The method of claim 1, wherein at least some of the multiple sub-spans have different lengths.

5. The method of claim 1, wherein the input power of each of the multiple sub-spans is acquired using input power of the natural span and a fiber attenuation coefficient.

6. A method for evaluating nonlinear impairment of an optical fiber link, the method comprising:

partitioning a natural span of the optical fiber link into multiple sub-spans, each of the multiple sub-spans determined based on chromatic dispersion (CD) equivalence;

for each of the multiple sub-spans, acquiring sub-span function parameters and a sub-span input power indicative of input power at a particular sub-span, the sub-span function parameters including noise variance and correlations between the particular sub-span and others of the multiple sub-spans; and determining the evaluation of nonlinear impairment of the optical fiber link based on the sub-span input power and the sub-span function parameters acquired for each of the multiple sub-spans, wherein determining the evaluation of nonlinear impairment of the optical fiber link comprises:

acquiring natural span function parameters based on the sub-span input power and the sub-span function parameters acquired for each of the multiple sub-spans; and determining the nonlinear impairment of the optical fiber link based on the natural span function parameters and a natural span input power indicative of input power at the natural span;

wherein the natural span function parameters are acquired based on a power ratio between the sub-span input power and the natural span input power.

7. The method of claim 6, wherein the natural span function parameters are acquired without absolute values of the sub-span input power and the natural span input power.

8. The method of claim 6, wherein the natural span function parameters are acquired based on link topology associated with the optical fiber link.

9. The method of claim 6, wherein at least some of the multiple sub-spans have different lengths.

10. The method of claim 6, wherein the input power of each of the multiple sub-spans is acquired using input power of the natural span and a fiber attenuation coefficient.

11. An apparatus for evaluating nonlinear impairment of an optical fiber link, the apparatus comprising:

a processor;

a machine readable memory including machine readable instructions, the machine readable instructions, when executed by the processor cause the apparatus to:

partition a natural span of the optical fiber link into multiple sub-spans, each of the multiple sub-spans determined based on chromatic dispersion (CD) equivalence;

for each of the multiple sub-spans, acquire sub-span function parameters and a sub-span input power indicative of input power at a particular sub-span, the sub-span function parameters including noise variance and correlations between the particular sub-span and others of the multiple sub-spans; and determine the evaluation of nonlinear impairment of the optical fiber link based on the sub-span input power and the sub-span function parameters acquired for each of the multiple sub-spans;

wherein the nonlinear impairment of the optical fiber link is evaluated independently from fiber type, fiber length, fiber attenuation and stimulated Raman scattering (SRS) associated with the optical fiber link; and wherein the noise variance and correlations between the particular sub-span and others of the multiple sub-spans depends on CD and signal modulation format.

12. The apparatus of claim 11, wherein the sub-span function parameters acquired for each of the multiple sub-spans are saved in a database.

13. The apparatus of claim 11, wherein the natural span function parameters are acquired based on link topology associated with the optical fiber link.

14. The apparatus of claim 11, wherein at least some of the multiple sub-spans have different lengths.

15. The apparatus of claim 11, wherein the input power of each of the multiple sub-spans is acquired using input power of the natural span and a fiber attenuation coefficient.

16. An apparatus for evaluating nonlinear impairment of an optical fiber link, the apparatus comprising:

a processor;

a machine readable memory including machine readable instructions, the machine readable instructions, when executed by the processor cause the apparatus to:

partition a natural span of the optical fiber link into multiple sub-spans, each of the multiple sub-spans determined based on chromatic dispersion (CD) equivalence;

for each of the multiple sub-spans, acquire sub-span function parameters and a sub-span input power indicative of input power at a particular sub-span, the sub-span function parameters including noise variance and correlations between the particular sub-span and others of the multiple sub-spans; and determine the evaluation of nonlinear impairment of the optical fiber link based on the sub-span input power and the sub-span function parameters acquired for each of the multiple sub-spans, wherein the apparatus determines the evaluation of nonlinear impairment of the optical fiber link by:

acquiring natural span function parameters based on the sub-span input power and the sub-span function parameters acquired for each of the multiple sub-spans; and determining the nonlinear impairment of the optical fiber link based on the natural span function parameters and a natural span input power indicative of input power at the natural span;

wherein the natural span function parameters are acquired based on a power ratio between the sub-span input power and the natural span input power.

17. The apparatus of claim 16, wherein the natural span function parameters are acquired without absolute values of the sub-span input power and the natural span input power.

18. The apparatus of claim 16, wherein the natural span function parameters are acquired based on link topology associated with the optical fiber link.

19. The apparatus of claim 16, wherein at least some of the multiple sub-spans have different lengths.

20. The apparatus of claim 16, wherein the input power of each of the multiple sub-spans is acquired using input power of the natural span and a fiber attenuation coefficient.

* * * * *